April 22, 1952     D. M. MORGENSTERN     2,594,056
REVERSIBLE REARVIEW MIRROR ASSEMBLY
Filed Aug. 2, 1950
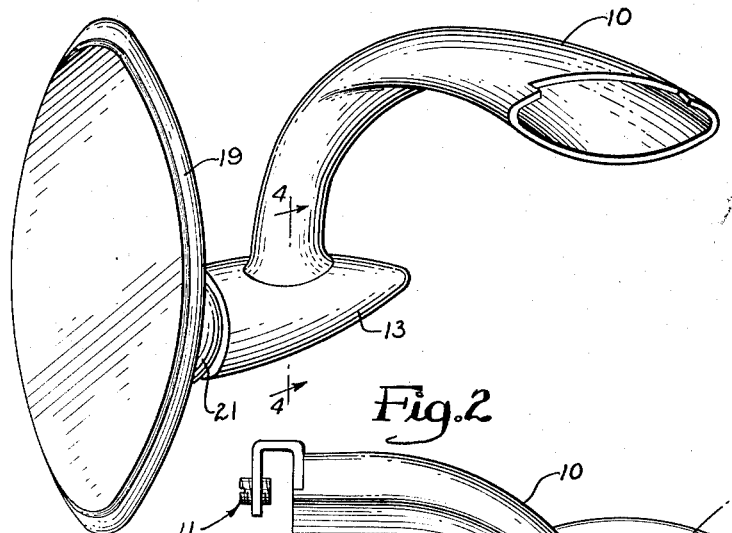
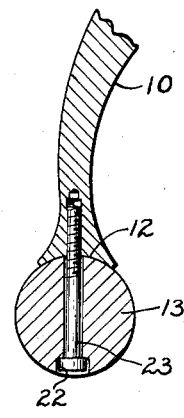
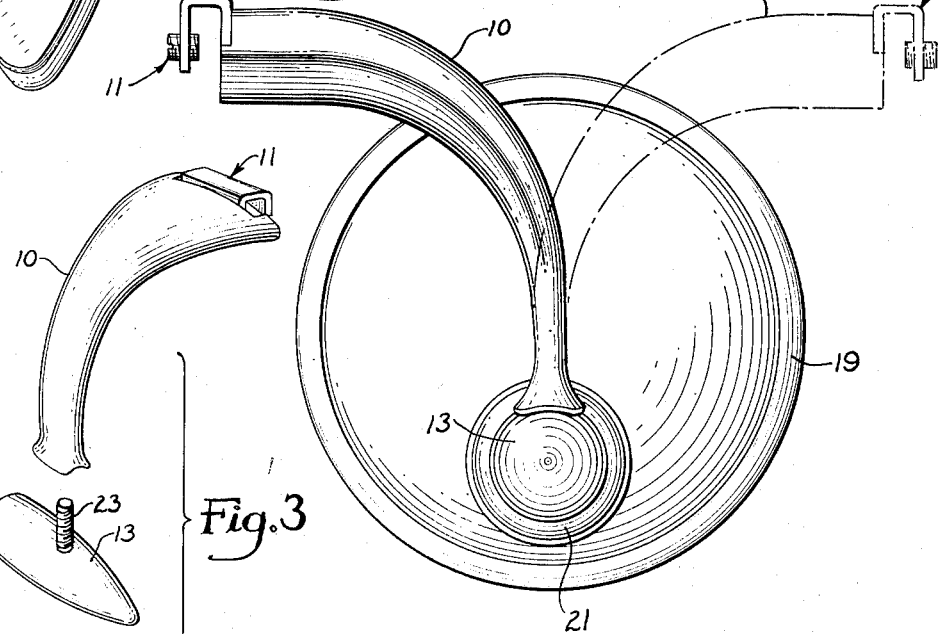
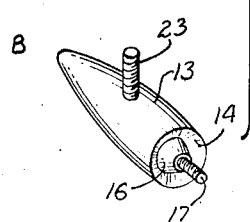
*Inventor*
David M. Morgenstern
by: Max R. Kraus
*Atty.*

Patented Apr. 22, 1952

2,594,056

UNITED STATES PATENT OFFICE 2,594,056

REVERSIBLE REARVIEW MIRROR ASSEMBLY

David M. Morgenstern, Cleveland, Ohio, assignor to Nelmor Corporation, Cleveland, Ohio, a corporation of Illinois Application August 2, 1950, Serial No. 177,249

3 Claims. (Cl. 88—98)

My invention relates to rear view mirrors for automotive vehicles and the like.

One of the objects of my invention is the provision of a rear view mirror assembly having supporting means so constructed that a mirror may be attached either to the right or the left hand side of an automotive vehicle, as desired. Heretofore, rear view mirrors of this type could be mounted only on one side of a vehicle, thereby requiring a different construction for each position of attachment. According to my invention a single rear view mirror assembly is provided, the said assembly being so arranged that the mirror may be mounted on either side of the vehicle.

Another object of my invention is the provision of a rear view mirror support of the foregoing type which is simple in construction, economical to manufacture and highly efficient in use.

Other and further objects and advantages of my invention will become apparent from the following description when considered in connection with the accompanying drawings, in which:

Fig. 1 is a perspective view illustrating my invention.

Fig. 2 is a rear elevational view thereof, and showing, in broken lines, a different position which the supporting arm is capable of assuming.

Fig. 3 is an exploded perspective view showing an element of the mirror support in two positions which the same is capable of assuming, and Fig. 4 is a cross-sectional view taken substantially on line 4—4 of Fig. 1.

Referring to the drawings, the numeral 10 indicates an arm which may be shaped substantially as shown, the said arm being provided at its free end with a clamping element, such as 11, by which the arm may be fastened as to the upper flange of the door of an automotive vehicle. It will be understood, however, that the arm and clamp may be of any suitable form and type and may be adapted for attachment to any other part of a vehicle. The opposite end of the arm 10 is provided with a seat 12 which, in the embodiment illustrated, is concave in form, such that it fits against the outer surface of a connecting member 13, commonly known in the trade as a torpedo. The said connecting member is provided at one end thereof with a concave seat 14 from which projects a central boss 16 in which is anchored a stud 17. A mirror assembly including a backing 19 provided with an embossed half-ball portion 21 is secured to the connecting member 13 with the half-ball portion 21 seated in the seat 14, in a well known manner to provide an adjustable swivel mounting. The connecting member 13 is provided with a transversely extending counter-bore 22 through which passes a bolt 23 adapted for threaded engagement with a threaded opening provided in the end of the arm 10, thereby to effect securement of the member 13 to the arm 10.

As will be apparent by reference to Fig. 3, the member 13 may be disposed relative to the arm 10 in either of the positions therein illustrated. Thus, as seen in Fig. 3, the member 13, in the upper position A, is directed so that the socket 14 is disposed towards the rear, while in the lower position B, the socket 14 is directed forwardly and, accordingly, the mirror and the mounting 19 will be similarly directed. Since, the clamping means 11 will effect attachment of the arm to either side of a vehicle, it will be apparent that the member 13 may be adjusted relative to the arm 10 so that the mirror carried by the member 13 is in proper position for use, regardless of which side of the vehicle to which the arm is attached. This is clearly seen by reference to Fig. 2 which shows, in solid lines, the arm disposed in one position relative to the mirror and, in broken lines, the arm disposed in another position relative to the mirror.

It will be apparent from the foregoing that I have provided novel means for effecting attachment of a rear view mirror to an automotive vehicle wherein a single mirror support may be selectively adapted for attachment of the mirror to either side of the vehicle, thereby permitting the use of a single structure where, heretofore, two different assemblies were required.

Although an exemplary form of my invention has been illustrated and described, it is to be understood that the disclosure is not restrictive, but is to embody such variations or modifications as will fall within the spirit of the invention and the scope of the appended claims.

I claim:

1. In a rear view mirror assembly for motor vehicles, the combination of an arcuately curved arm having one end adapted for attachment to a vehicle and having at the other end a socket, a mirror support having a complemental surface portion adapted to engage in said socket in one of at least two opposed relative positions at the sides of the vehicle with the longitudinal axis of said arm being disposed in a plane at a right angle to a longitudinal axis of said support, means for securing said support to said arm in one of said positions and a mirror swively connected to one end of said support and disposed normally in a plane at a right angle to the longitudinal axis of the support and parallel to the plane of the longitudinal axis of the arm.

2. The invention as defined in claim 1, characterized by a socket having a substantially cylindrical surface portion and a mirror support having a complemental surface engageable therewith.

3. The invention as defined in claim 1, characterized by an arm which is comprised of an inverted substantially L shaped member.

DAVID M. MORGENSTERN.

REFERENCES CITED

The following references are of record in the file of this patent:

UNITED STATES PATENTS

| Number | Name | Date |
|---|---|---|
| 1,493,609 | Dailey | May 13, 1924 |
| 1,921,310 | Crisman | Aug. 8, 1933 |
| 1,972,246 | Sauer | Sept. 4, 1934 |
| 2,333,671 | Peters et al. | Nov. 9, 1943 |
| 2,338,780 | Poncher et al. | Jan. 11, 1944 |